J. CROWE.
MACHINE FOR MEASURING AND WINDING WALL PAPER IN COMMERCIAL ROLLS.
APPLICATION FILED AUG. 6, 1917.
1,298,013.
Patented Mar. 25, 1919.
6 SHEETS—SHEET 2.
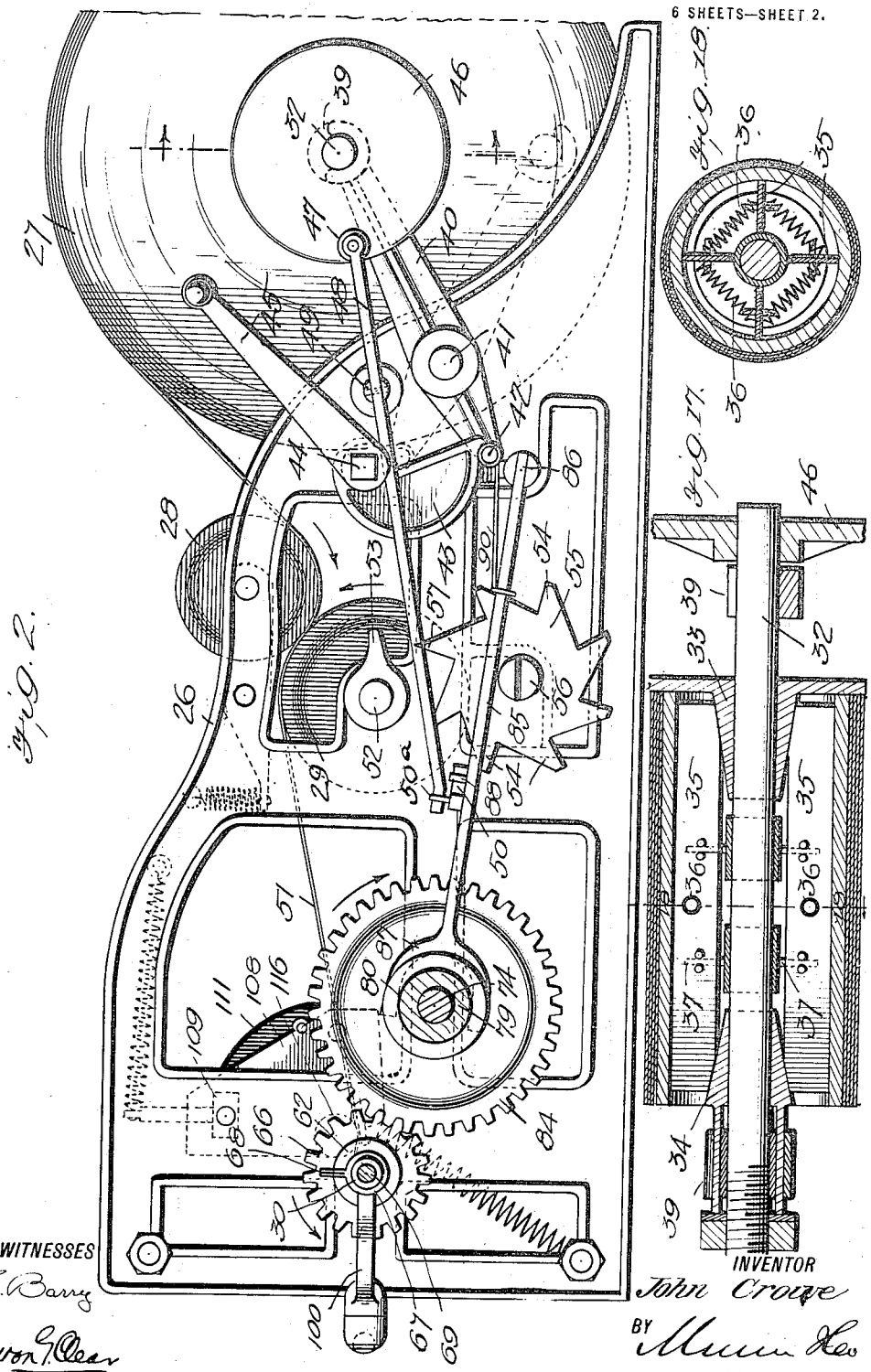

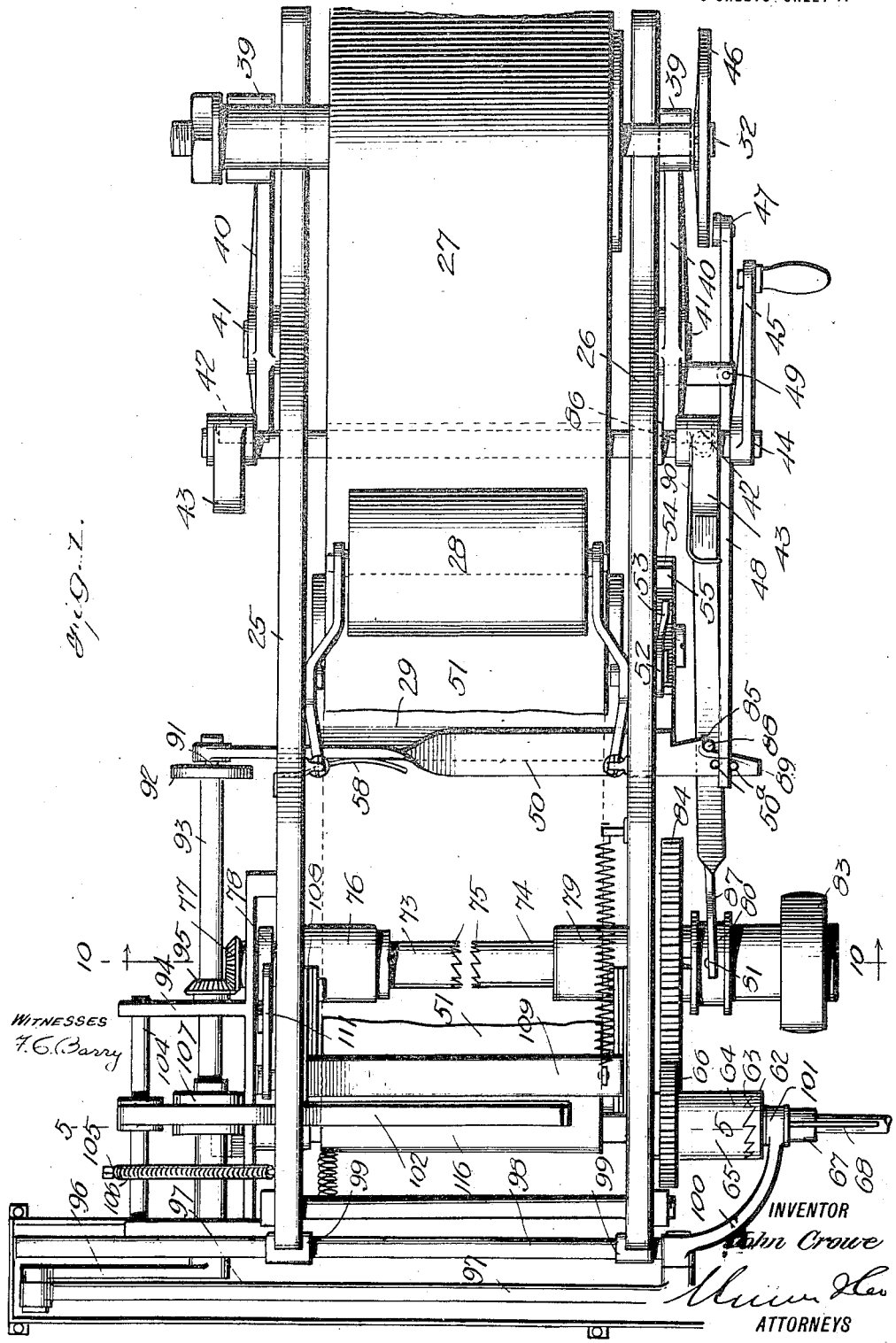

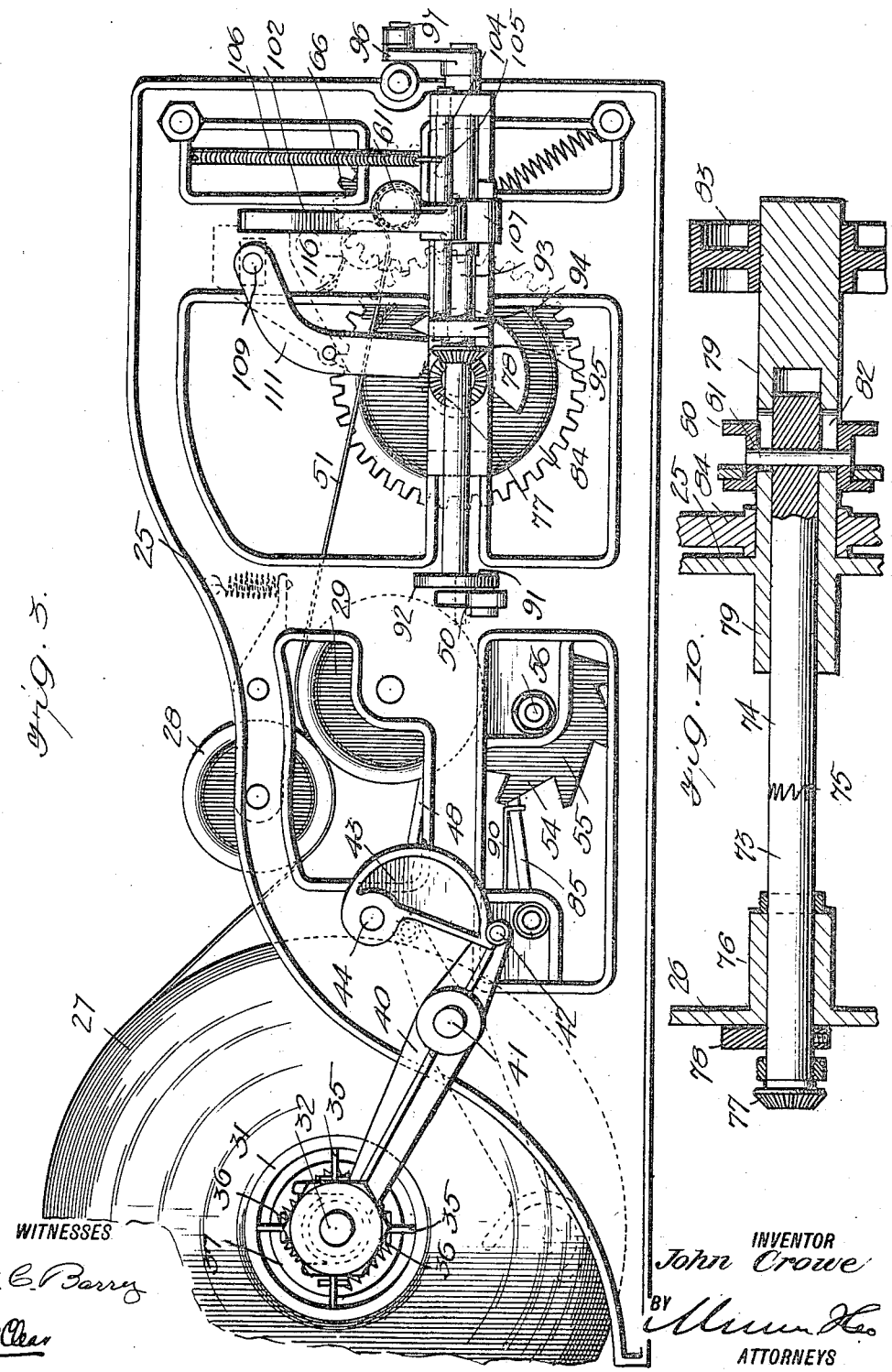

J. CROWE.
MACHINE FOR MEASURING AND WINDING WALL PAPER IN COMMERCIAL ROLLS.
APPLICATION FILED AUG. 6, 1917.
1,298,013.
Patented Mar. 25, 1919.
6 SHEETS—SHEET 4.
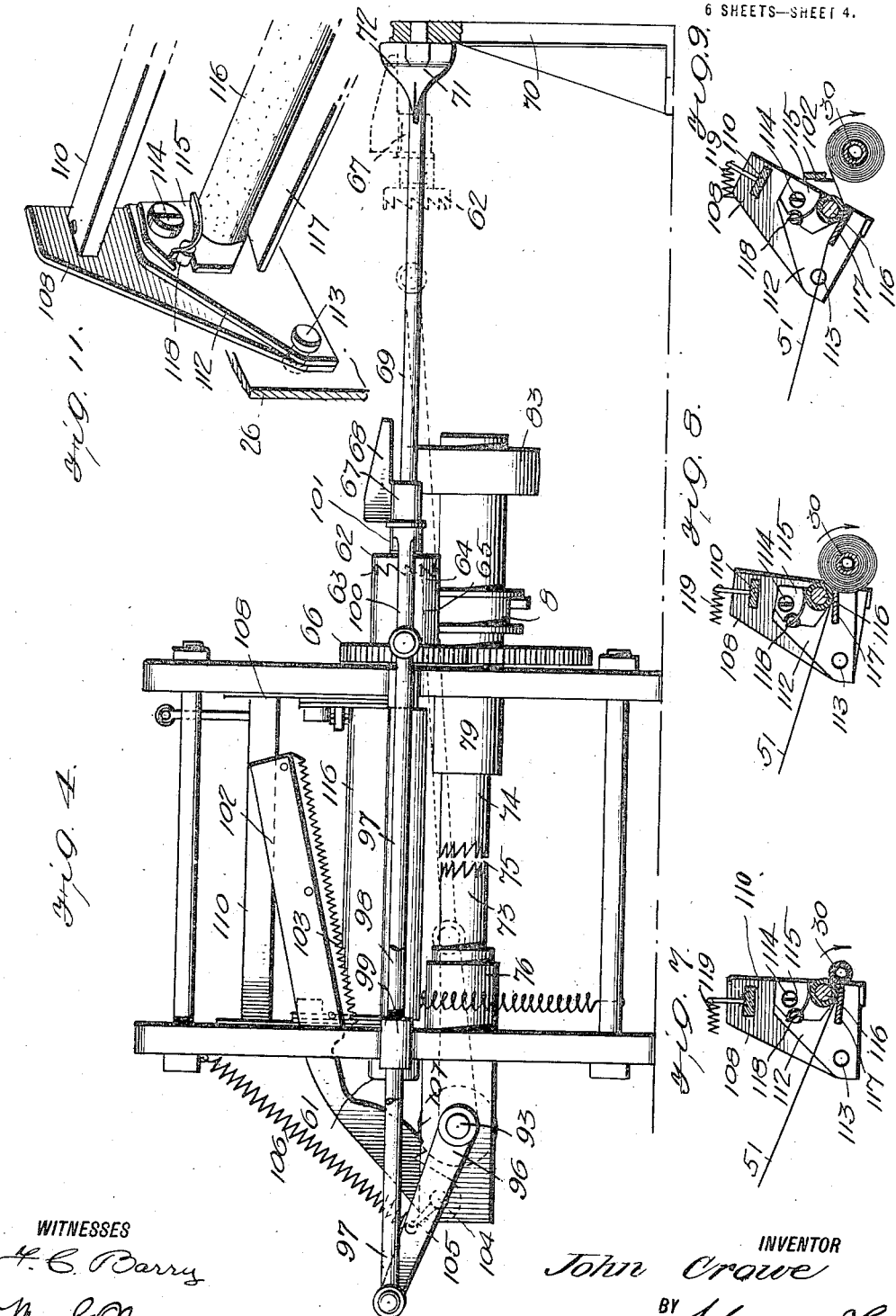
WITNESSES
INVENTOR
John Crowe
BY
ATTORNEYS

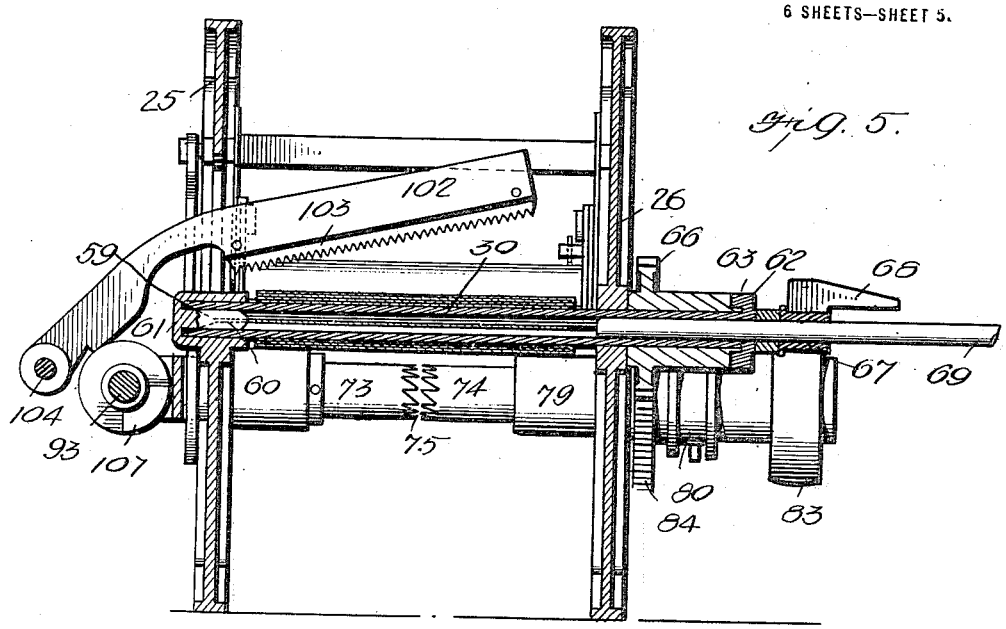
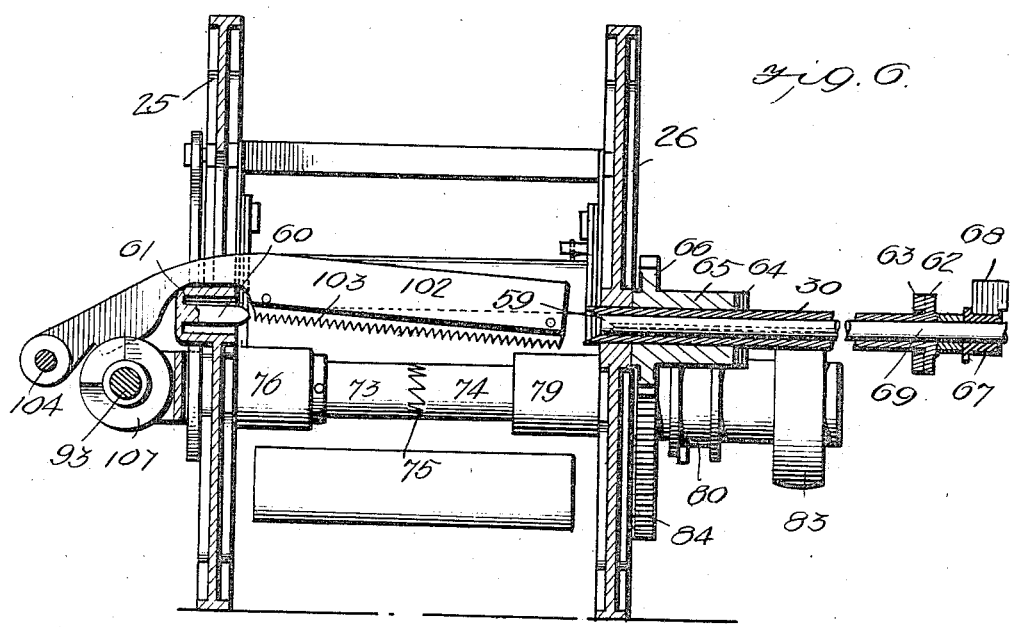

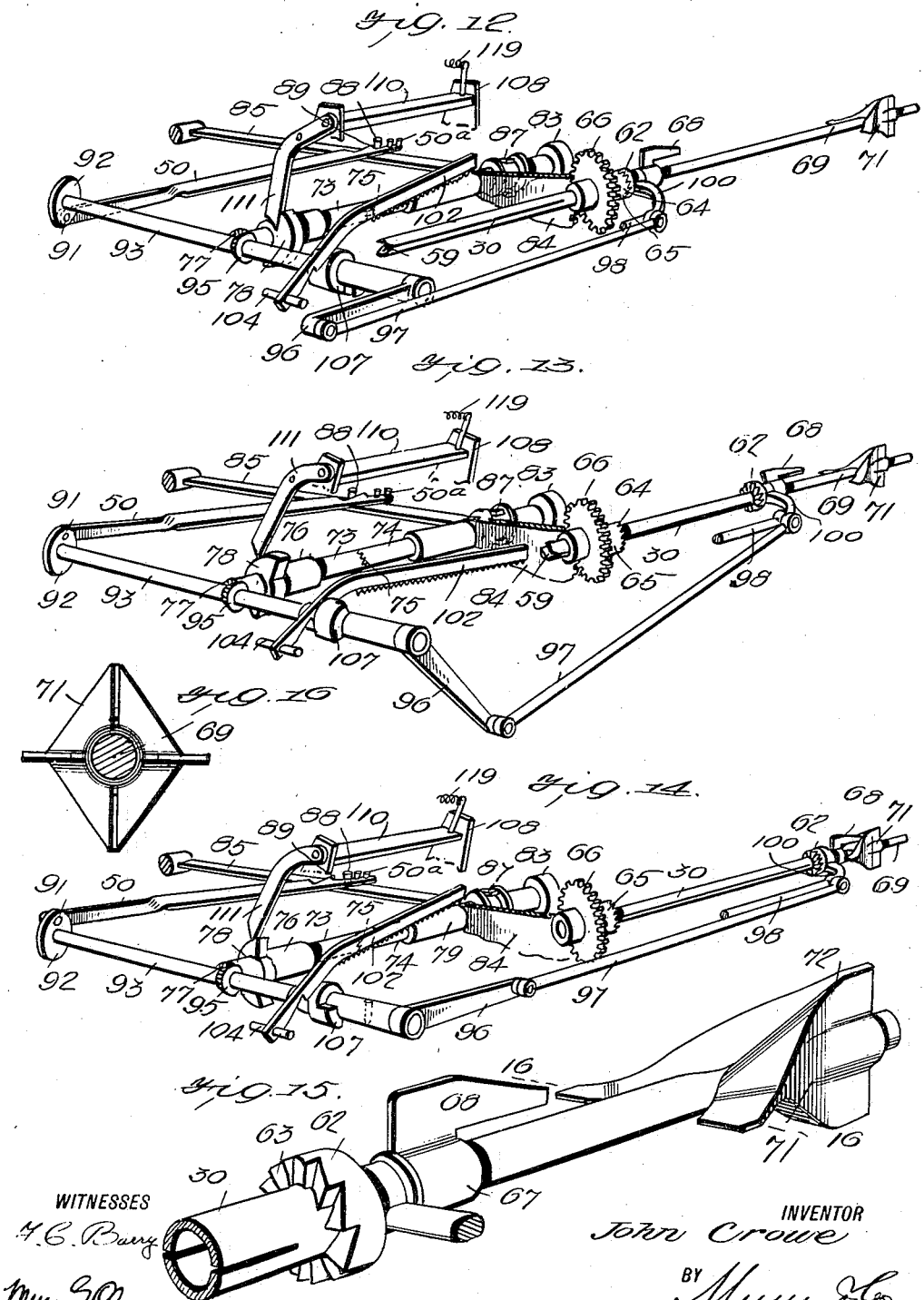

UNITED STATES PATENT OFFICE.

JOHN CROWE, OF ST. JOSEPH, MISSOURI.

MACHINE FOR MEASURING AND WINDING WALL-PAPER IN COMMERCIAL ROLLS.

1,298,013.  Specification of Letters Patent.  Patented Mar. 25, 1919.

Application filed August 6, 1917. Serial No. 184,711.

*To all whom it may concern:*

Be it known that I, JOHN CROWE, a citizen of the United States, and a resident of St. Joseph, in the county of Buchanan and State of Missouri, have invented an Improvement in Machines for Measuring and Winding Wall-Paper in Commercial Rolls, of which the following is a specification.

My present invention relates generally to winding or reeling devices, and more particularly to a machine for winding commercial rolls of paper, especially wall paper, from what are known as "jumbo rolls", in which form the paper of this character is supplied to wholesalers from the factories. In practice, at present, numbers of small rolls capable of ready handling by retailers and by the trade, and therefore known as commercial rolls, are made up from the jumbo rolls either by hand reeling, or by power machines which are hand controlled, both methods consuming an unjustified amount of time and entailing considerable waste.

It is, therefore, the primary object of my invention to provide a machine which will act continuously in a wholly automatic manner to wind commercial rolls, discharge the rolls as wound, and reset the parts for each subsequent roll.

It is a further object of the invention to provide a machine capable of the foregoing functions and of operation in a speedy, effective maner, and in such a way as to eliminate all waste.

A still further object is the provision of a mechanism capable of carrying out the foregoing objects and of such nature as to insure economical manufacture and upkeep as well as continuous and effective operation.

A still further object is to provide a construction in which the several parts are readily accessible for purposes of repair, substitution, or interchange.

In the accompanying drawings, illustrating my present invention and forming a part of this application, Figure 1 is a plan view of the complete machine.

Fig. 2 is a side elevation thereof.

Fig. 3 is a side elevation looking at the opposite side with respect to Fig. 2.

Fig. 4 is a front elevation, illustrating, in dotted lines, the winding shaft in retracted position.

Figs. 5 and 6 are vertical transverse sections through forward portions of the machine, illustrating the winding shaft, respectively, in its inner or operative position and its outer or retracted position.

Figs. 7, 8 and 9 are vertical longitudinal sections through the winding shaft and the paper carriage adjacent thereto, illustrating different positions of the latter in the operation of the machine.

Fig. 10 is a vertical transverse section through the driven shaft taken substantially on the line 10—10 of Fig. 1.

Fig. 11 is a detail perspective view of a portion of the frame and paper carriage.

Figs. 12, 13 and 14 are diagrammatic perspective views illustrating certain of the operating parts in different positions during the operation.

Fig. 15 is a detail perspective view of a portion of the winding shaft and its support.

Fig. 16 is a detail vertical section through certain of the parts of Fig. 15.

Fig. 17 is a longitudinal section through the reel of the feed roll, and

Fig. 18 is a vertical transverse section taken substantially on line 18—18 of Fig. 17.

Referring now to these figures, the frame of my improved machine consists of a pair of parallel vertically disposed side walls 25 and 26, suitably braced in spaced apart relation, and defining between them a path through which a web of paper is movable from a jumbo roll 27, seen particularly in Figs. 2 and 3, the web passing beneath an intermediate pressure roll 28 and over a measuring roll 29, in its path between the jumbo roll 27, located at the rear of the frame, and the winding shaft 30, located at the front of the machine.

The jumbo roll 27 is mounted upon a reel 31, the shaft of which appears at 32, this reel being formed in the manner shown in Fig. 17 presently described, and provided with a pair of oppositely presented cones 33 and 34, of which the taper of the movable cone 34 is more abrupt than that of the stationary cone 33, in order to properly shift and expand the roll clamping arms 35 disposed parallel with the axis of the shaft 32 in a series therearound. These clamping arms 35 are connected by a resilient intermediate connection 36 and work in radial slots in disks 37 mounted on the shaft 32, the construction permitting those ends of the clamping arms adjacent the cone 33 to climb the latter in the same proportion as the more abrupt cone 34 enters between the opposite ends of the arms of the shaft 32, so that the outer edges of the arms 35 will be maintained parallel with the axis of the shaft 32 at all times. It is obvious that by the means described the jumbo roll may be uniformly clamped internally thereof, the end of the shaft 32 adjacent the cone 34 having threads providing for the reception of a nut for adjusting the said cone.

The outer ends of the shaft 32 are seated in upwardly opening bearings 39 at the rear of side supporting arms 40 fulcrumed at 41 intermediate their ends upon the frame walls 25 and 26, the forward ends of the said supporting arms 40 having rollers 42 engaged by cams 43 so as to shift the arms to raise and lower the reel 31 in renewing the jumbo roll, particularly in elevating the new roll after its placement upon the bearings 39. For this purpose the cams 43 are secured upon the outer ends of a transverse shaft 44 extending through the frame and having upon one end a crank 45 providing for its manual rotation.

At one end, the reel shaft 32 is further provided with a brake disk 46, as seen particularly in Fig. 1, arranged to be engaged by the rear shoe 47 of a brake rod 48 extending forwardly at the outer side of the frame wall 26 and intermediately pivoted at 49, the forward end of the said rod 48 projecting between vertically extending pins 50ª of a transversely extending latch bar 50, movable through the side walls 25 and 26, and whose particular functions will be particularly brought out in the description hereinafter.

As before stated, the paper web 51, in its passage from the jumbo roll 27 to the winding shaft 30, extends between the pressure roll 28 and the measuring roll 29, the former of which bears upon the paper web at a point slightly to the rear of the vertical plane of the axis of the measuring roll and yieldingly engages the latter so as to cause rotation of the measuring roll as the paper is drawn forwardly by the rotation of the winding shaft 30.

At one end, beyond the side wall 26, the shaft 52 of the measuring roll has a projecting finger 53 adapted to successively engage the teeth 54 of a measuring wheel 55, the latter detachably held at the outer face of the wall 26 below the finger 53 by a set screw 56, so as to provide for its interchange, that is the use of a wheel having the teeth 54 in desired number, it being evident that a complete rotation of the measuring wheel 55 is effected by a number of rotations of the measuring roll. One of the teeth of the measuring wheel 55, as particularly seen at 57 in Fig. 2, is elongated, so that when brought to a point adjacent the respective end of the latch bar 50, it will engage the latter and force the same forwardly against the tension of the latch bar spring, as seen at 58 in Fig. 1.

The winding shaft 30 is hollow, as particularly seen in Figs. 5 and 6, and, in addition to its rotation, is longitudinally shiftable through the wall 26 into and out of the space between the walls, the inner end of said shaft having diametrically opposed V-shaped cut out portions 59 forming guides, the inner portions of which are at the outer ends of diametrically opposed longitudinal slots with which the winding shaft is also provided. As seen in Fig. 5, the inner recessed end of the winding shaft 30 engages over a stud 60 carried by a socket piece 61, mounted in connection with the frame wall 25, which stud 60 interfits the bore of the shaft, in the operative position of the latter, to prevent the paper from forcing the split portions of the shaft toward one another as it is being wrapped therearound during rotation of the shaft.

Outwardly beyond the side wall 26, the shaft 30 is provided at its outer end with an enlargement 62 having ratchet teeth 63, the latter of which are engaged by ratchet teeth 64 at the outer end of a sleeve 65. This sleeve carries a gear wheel 66 and is journaled in the side wall 26. The outer end of the hollow winding shaft also has a collar 67 provided with a guide finger 68 projecting outwardly therefrom in a direction parallel to the axis of the shaft, the outer portion of this shaft being mounted, as will be noted from Figs. 4, 5 and 6 in particular, upon a guide bar 69 on which the shaft slides in its longitudinal shifting movements into and out of the space between the side walls of the frame.

The forward end of the paper web 51 is engaged through the longitudinal slots of the winding shaft so that upon rotation of the winding shaft through clutch 63—64, the web will be wound thereon, this winding continuing in the operation of the machine for one complete rotation of the measuring wheel 55, when, through certain parts to be hereinafter described, the web is cut off adjacent the winding shaft, and the latter withdrawn longitudinally from the roll wound thereon so as to provide for the discharge of said roll. After the roll is discharged, the free end of the web 51 is held, by certain means to be presently described, in such manner that upon return movement of the winding shaft longitudinally from the position shown in Fig. 6 to the position shown in Fig. 5, the free end of the web will be received in the slots of the winding shaft, for which purpose it is evident that the slots must be held in alinement with the plane of the paper web. To insure this alinement, the outer end of the rod 69 on which the hollow winding shaft slides, and which is supported by a bracket 70 seen in Fig. 4, has a cam-shaped head 71, the upper and lower cam surfaces 72 of which are each adapted for engagement by the finger 68, before described, so as to partially turn the winding shaft to the proper position at the end of its outward movement, at which time it is to be observed that the clutch 63—64 is disengaged and the gear 66 thus freely rotates as an idler.

Referring now to Figs. 1 and 10 in particular, a driven shaft is mounted through the frame in axially alined sections 73 and 74 having coöperating clutch teeth 75 at their inner adjacent ends. The section 73 of the driven shaft is journaled through a bearing 76 carried by the frame wall 25, and has a bevel gear 77 at its reduced outer end, beyond the paper carriage controlling cam seen at 78.

The other section 74 of the driven shaft has its outer portion extending through a rotatable sleeve 79 and is secured adjacent its outer end to an annularly grooved collar 80, surmounting and slidable on the outer portion of the sleeve 79, the connection between the shaft section 74 and collar 80 being made by pins 81 which extend through longitudinal slots 82 of the sleeve 79 so as to provide for shifting movements of the shaft section 74 and its collar 80 with respect to the sleeve 79, the latter of which is longitudinally immovable.

On the outer end of the sleeve 79 is a pulley or other member 83, by which power from any suitable source may be conveyed thereto, this sleeve also carrying a gear wheel 84 permanently in mesh with the gear wheel 66 of the winding shaft sleeve 65, so that, with the parts in the position shown in Fig. 1, the normal operation is rotation of the sleeve 79, from a suitable source of power, transmitted through gears 84 and 66 to the winding shaft, the clutch 63—64 being engaged. In this way the winding shaft is rotated to roll the web thereon until the shaft section 74 is shifted to engage its clutch teeth with the clutch teeth of the shaft section 73. This is brought about through the connection of the measuring wheel, by virtue of an arm 85 pivotally supported at its outer end at 86, outside of the frame wall 26, and having at its forward end a yoke 87 extending within the annular groove of the collar 80, it being noted that the groove of the latter is considerably wider than the yoke 87 so as to provide for relative movement of these parts for a purpose which will be presently made plain. Intermediate its ends the arm 85 has a vertically projecting pin 88 normally engaged by an outwardly presented shoulder 89 adjacent the free end of the latch bar 50, so as to hold the free end of the arm 85 against inward movement under tension of its spring 90. As soon, however, as the actuating tooth 57 of the measuring wheel 55 engages the free end of the latch bar 50, thrusting the latter forwardly to move its shoulder 89 beyond the pin 88, the arm 85 is free to move inwardly upon its pivot 86 and under tension of its spring 90, so as to shift the collar 80 and consequently the shaft section 74 inwardly with respect to the sleeve 79, so as to engage the clutch teeth 75 of the shaft sections 73 and 74.

At its opposite end the latch bar 50 is journaled upon the crank pin 91 of a disk 92 secured upon the rear end of a shaft 93, mounted in brackets 94 projecting laterally from the side wall 25, with which the shaft is substantially parallel. At an intermediate point the shaft 93 has a bevel gear 95 in engagement with the bevel gear 77 of the shaft section 73, so that when the shaft sections 73 and 74 are connected, shaft 93 is rotated through the gears 77 and 95 and during the rotation of shaft 93 the crank connection of the latch bar 50 therewith shifts the latch bar longitudinally so as to move its shoulder 89 inwardly beyond the pin 88 of the arm 85 in the inner position of the latter, and then again shift the latch bar outwardly so that its shoulder being in engagement with the pin 88, the latter and the arm 85 will be again shifted outwardly so as to move the shaft section 74 out of engagement with the shaft section 73 and thus break the driving connections to the shaft 93. By virtue of the fact, however, that the mechanism performing this function gets its power through the clutch teeth 75, which said connections are themselves intended to release, it is necessary that the shaft sections 74 have some independent movement with respect to the shifting arm 85, as previously described, so that any tendency of the clutch teeth 75 to grind against one another will be avoided.

At the forward end of shaft 93 is a crank arm 96 pivotally connected at its outer end to a pitman 97 extending transversely across the front of the machine and pivotally connected at its opposite end to a slide bar 98, the latter of which moves in guides 99 at the forward ends of the walls 25 and 26 and is in turn connected by a curved arm 100 at its free end to the winding shaft, arm 100 having a bearing member 101 at its end through which the outer portion of the winding shaft extends. Thus during the complete rotation of the shaft 93 when the shaft sections 73 and 74 are clutched, the winding shaft is moved longitudinally from the position shown in Fig. 5 to the retracted position of Fig. 6 and back again to the operative position shown in Fig. 5.

Extending through the wall 25 of the frame and into the space between the walls 25 and 26 is a vertically swinging transverse knife bar 102, to the inner portion of which is secured a toothed paper cutting blade 103, the outer end of said knife bar being movably supported upon a shaft 104 supported by the brackets 94, as seen in Fig. 1, the said shaft having an arm 105 connected by a spring 106 to the frame so as to force the knife bar downwardly under control of a cam 107 mounted on the shaft 93. This knife operates in a plane slightly to the rear of the axial plane of the winding shaft, as will be seen by reference to Fig. 9, its function is to cut the paper web when a commercial roll has been completed upon the winding shaft, and during the time the winding shaft is being withdrawn from such roll.

In order to properly support the paper web adjacent the winding shaft and feed the free end of the web forwardly to the latter after it has been returned subsequent to the discharge of a completed roll therefrom, a pair of side plates 108 are pivotally supported at 109 adjacent their upper ends, against the inner surfaces of the side walls 25 and 26, and connected by a cross bar 110, which latter is extended through the wall 25 and has connected thereto the upper end of an arm 111 fulcrumed upon the outer surface of the side wall 25 and engaged at its lower end by the cam 78, before-mentioned. The plates 108 have against their inner surfaces a pair of plates 112, pivoted at their lower rear portions at 113, and in turn pivotally supporting at 114 a pair of plates 115, the latter of which support the journals of a roller 116 opposing a transverse flat plate 117 connecting the plates 112.

The construction just above described, which is plainly shown in Figs. 7, 8 and 9, forms what I have termed a paper carriage, the different parts of which are shiftable upon the pivots 109, 113 and 114 in the operation of the machine for the purposes which will now be described. The movement of the plates 115 carrying the roller 116 is limited by studs 118, the normal vertical plane of roller 116 being, as shown in these figures, forwardly of the vertical plane of the pivots 114, rearward movement of the plates 115 serves to carry the roller toward the bearing plate 117. The roller 116 and plate 117 are together yieldable upon pivots 113 of the plates 112 so as to follow the movements of the paper web as the roll on the winding shaft increases in diameter and being shiftable vertically for this purpose, while the entire carriage, including the plates 108, 112 and 115, is shiftable upon the pivots 109 against tension of a spring 119 and under operation of the cam actuated arm 111, to move the carriage away from the winding shaft previous to the descending movement of the knife bar 102. By reference to Figs. 7 and 8 it will be noticed that in the normal position of the paper carriage, between the roller 116 and plate 117 of which the paper web 51 is fed to the winding roll, it extends contiguous to the winding shaft and remains so until under actuation of the cam 78 it is shifted away from the winding shaft, as in Fig. 9, during which movement and during the winding of the shaft, the paper web 51 is free to move between the roller 116 and plate 117 by virtue of the yielding of the plates 115 with the roller 116 in the forward direction. When, however, the paper carriage has been shifted rearwardly previous to the descent of the web cutting knife, the web is engaged and clamped by the roller 116 against the plate 117 with a portion of the web extending forwardly beyond the roller so that when the carriage is again shifted to its forward position after the knife bar 102 has been raised, that portion of the web just mentioned extending forwardly beyond the roller 116 will be shifted forwardly and the web itself pulled forwardly so that the said projecting portion thereof will be in position for engagement by the slotted winding shaft when the latter is again thrust inwardly.

In operation, a jumbo roll 27 is elevated to the operative position shown in Figs. 2 and 3 in particular by the elevating devices previously described, and the web 51 is extended forwardly therefrom over the measuring roll 29 and beneath the pressure roll 28 and is thence extended forwardly between the roller 116 and plate 117 and through the slots of the winding shaft. With the parts in this position the machine is ready for operation, rotation of the shaft section 74 serving to transmit rotation through the gears 84 and 66 and through clutch 63—64 to the winding shaft in order to cause rotation of the latter. With the parts of the paper carriage in the position shown in Fig. 7, the web may be drawn freely in a forward direction by the rotation of the winding shaft, between the roller 116 and plate 117, as previously described, and during the winding of the commercial roll on the winding shaft, these parts may yield in a vertical direction in unison by virtue of the movement of the plates 112 upon their pivots 113, as seen by a comparison of Figs. 7 and 8.

During this time the rotation of the measuring roll 29 has been rotating the finger 53, of course, which latter has induced step by step rotation of the measuring wheel 55. When the latter has made a complete rotation and its elongated tooth 57 strikes the latch bar 50 and thrusts the latter forwardly against the tension of its spring 58, the clutch 75 is engaged between the sections 73 and 74 of the driven shaft, and at this point it is to be noted that the elongated tooth 57 will be successfully carried beyond the plane of the latch bar by virtue of the fact that following engagement of the clutch faces 75 the winding shaft is still rotated and is still drawing the paper web onto the same until, subsequent to the start of rotation of the shaft 93, the winding shaft has been shifted longitudinally a sufficient distance to disengage the clutch faces 63 and 64.

It will be obvious from the foregoing that during the retractile movement of the winding shaft the knife bar 102 descends so as to sever the web by means of its blade 103, previous to which the paper carriage has been shifted rearwardly to the position shown in Fig. 9 to engage the web at a point rearwardly of the winding shaft, the mounting of the roller 116 enabling the latter to act as a clamp for gripping the paper at such point so that after the knife has been raised and the paper carriage again shifted forwardly, adjacent to the vertical plane of the winding shaft, a projecting portion of the web remains to be engaged by the winding shaft through its slots when the latter is again moved inwardly.

It will be obvious, furthermore, that after the machine is started, no further attention will be required on the part of the operator until the jumbo roll is exhausted and it is necessary to place a new roll in position, and that during the operation of the machine successive commercial rolls will be wound upon the winding shaft, cut off from the web, discharged, and the parts reset in position for subsequent winding operation, all in a manner entirely automatic, and without waste of paper.

It will, furthermore, be apparent that the operation, as described, will be both speedy and effective for the purposes stated, and that the machine is of such nature as that it is capable of similar operations in connection with paper webs of varying widths such as encountered in the wall paper trade. Machines may be provided for webs of varying widths, or machines intended for operation in connection with webs of maximum width may be freely utilized with webs of less than the maximum width.

It is further to be appreciated that various changes and modifications may be made in the particular constructions, the formation and action of which have been fully described, and it is to be noted that all such are specifically reserved that fall within the terms of the appended claims.

One further observation is to be made, however, in connection with the checking of movement of the feed roll 27 through the application of the shoe 47 of the brake bar 48 to the brake disk 46 of the feed roll. When the measuring wheel 55 shifts the latch bar 50 forwardly at substantially the end of each winding operation and clutch 75 is closed thereby, the initial rotation of shaft 93 shifts latch bar 50 longitudinally in the direction of its free end slightly farther than the normal position of the said latch bar during the winding operation, so that the forward end of the brake bar 48 is thus thrust outwardly a slight distance, sufficient to shift the rear end and the brake shoe 47 into engagement with the brake disk 46. From this it will be appreciated that as soon as the latch bar 50 is shifted longitudinally in the opposite direction, that is toward shaft 93, the pressure of the brake shoe 47 is released so that in the subsequent operation of the parts to discharge the finished roll between two winding operations, the feed roll 27 will be free so that the paper feed carriage can, after the web has been gripped between roller 116 and plate 117, freely shift the extreme end of the web forwardly into the path of inward movement of the winding shaft, as previously described.

I claim:

1. A winding device for paper rolls consisting of a frame, a paper feed roll having bearings in the frame, means for guiding the paper fed from the said feed roll, including measuring and pressure rolls between which the paper web extends, and a swinging paper carriage having means to grip the paper web upon movement in one direction, a rotatable and longitudinally shiftable winding shaft adjacent the feed carriage and onto which the web is fed, a driven shaft, connections between the driven shaft and the said winding shaft for rotating the latter and including a clutch controlled by the shifting movement of the winding shaft, clutch controlled and normally inactive connections from the driven shaft for shifting the winding shaft into and out of engagement with the paper web and including means for swinging the said paper carriage, a web cutting member also actuated by the said clutch controlled connections, and means controlled by the said measuring roll for actuating the clutch of the said connections.

2. A winding device for paper rolls consisting of a frame, a paper feed roll having bearings in the frame, means for guiding the paper fed from the said feed roll, including measuring and pressure rolls between which the paper web extends, and a swinging paper carriage having means to grip the paper web upon movement in one direction, a rotatable and longitudinally shiftable winding shaft adjacent the feed carriage and onto which the web is fed, a driven shaft, connections between the driven shaft and the said winding shaft for rotating the latter and including a clutch controlled by the shifting movement of the winding shaft, said driven shaft being in two parts having relatively engaging clutch faces, and one part of which is connected to the winding shaft to rotate the latter, connections between the other part of the winding shaft for shifting the latter and including means whereby to actuate the paper carriage, and means controlled by the said measuring roll to shift said shaft parts into and out of engagement.

3. A winding device for paper rolls consisting of a frame, a paper feed roll having bearings in the frame, means for guiding the paper fed from the said feed roll, a rotatable and longitudinally shiftable winding shaft onto which the paper is fed, a cutting knife, a paper feed carriage movable toward and away from the said winding shaft, and automatically controlled connections for actuating said winding shaft, cutting knife and paper feed carriage.

4. A winding device including a feed roll, a slotted winding shaft mounted to rotate and shift longitudinally into and out of engagement with the web from the feed roll, and a paper carriage adjacent the said winding shaft and movable toward and away from the same for the purpose described.

5. A winding device including a feed roll, a slotted winding shaft mounted to rotate and shift longitudinally into and out of engagement with the web from the feed roll, a paper carriage adjacent the said winding shaft and movable toward and away from the same for the purpose described, and paper cutting means operable between the winding shaft and the said paper feed carriage.

6. A winding device including a feed roll, a slotted winding shaft mounted to rotate and shift longitudinally into and out of engagement with the web from the feed roll, and a paper carriage adjacent the said winding shaft and movable toward and away from the same for the purpose described, said paper feed carriage having paper guiding means shiftable vertically independent of the carriage as the paper is wound upon the winding shaft, and having movement to grip the paper when the said carriage is shifted in one direction.

7. A winding device including a feed roll, a slotted winding shaft mounted to rotate and shift longitudinally into and out of engagement with the web from the feed roll, and a paper carriage adjacent the said winding shaft and movable toward and away from the same for the purpose described, said paper feed carriage having a paper guiding roller movably mounted therein and operating as a paper clutch in the movement of the carriage in one direction.

8. A winding device including a feed roll, a slotted winding shaft mounted to rotate and shift longitudinally into and out of engagement with the web from the feed roll, and a paper carriage adjacent the said winding shaft and movable toward and away from the same for the purpose described, said carriage having a paper guiding roller yieldable in one direction and adapted to clutch the paper web in the opposite direction.

9. In a winding device for paper rolls, the combination of a slotted winding shaft mounted to rotate and move longitudinally, a paper carriage movable toward and away from said shaft and arranged to grip and move the paper toward the shaft independent of movement of the latter between the winding operations, and a cutting knife movable between said winding shaft and said carriage when the latter is in remote position with respect to the shaft.

10. In a winding device for paper rolls, the combination of a feed roll, a winding shaft onto which the paper is fed from the feed roll, said winding shaft being rotatable to wind the paper web therefrom and longitudinally shiftable for movement away from the feed roll, means for severing the web at the end of each winding operation, means for shifting the severed end of the web toward the winding shaft at the beginning of each winding operation for engagement by the shaft, and means for checking movement of the feed roll at the end of each winding operation.

11. A machine for winding rolls of material, including a feed roll, a winding shaft rotatable during each winding operation and longitudinally shiftable into and out of engagement with the material to be wound, means for severing the material at the end of each winding operation, connections for automatically controlling the rotation, and shifting movements of the winding shaft and the action of the said severing means in timed relation, and a brake coöperating with the feed roll and actuated by said connections for checking movement of the former at the end of each winding operation.

JOHN CROWE.